Patented Apr. 29, 1930

1,756,152

UNITED STATES PATENT OFFICE

TOKUJIRO HASHIMOTO, OF TOKYO, JAPAN

PROCESS FOR MANUFACTURING TOILET MATERIAL

No Drawing.   Application filed November 17, 1928. Serial No. 320,224.

The present invention relates to a process for manufacturing toilet material consisting in mixing substances which have sterilizing, healing or cleaning action with india rubber solution.

The present invention is supplementary to the invention described in the patent application Ser. No. 319,916 which relates to a process for manufacturing toilet material characterized in that the mixture of india rubber and tragacanth gum and volatile element included therein are boiled under pressure so as to reduce the viscosity without impairing its volatility.

The process according to the present invention is characterized in that india rubber emulsion is first boiled under pressure to reduce the viscosity and then the same is subjected to distillation process under reduced pressure in order to drive away the volatile element contained therein.

The toilet material thus produced is in a thin liquid state and has no viscosity peculiar to gum. It will form thin coating upon the skin immediately after being applied and thereby dirt absorbing action peculiar to gum and sterilizing, healing or cleaning action of the substances can be attained.

To carry the present invention into effect, dissolve well ground india rubber with volatile solvent such as ether or benzol while heating. The final concentration should be about 50–100 of said solvent containing about 10 of the india rubber.

Then, add a sufficient quantity of distilled water into said solution and stir well so as to form india rubber emulsion. The concentration of india rubber in the emulsion should be approximately 2%–5%.

If the volatile solvent is removed from said india rubber emulsion, india rubber contained in it will be reduced and will coagulate at once.

So, in order to eliminate such coagulative property and to reduce the viscosity peculiar to gum, said emulsion is boiled under about 10 atmospheric pressure for about 30 minutes and is kept still and cool. Then, distill it under reduced pressure so as to drive away the volatile element. The liquid thus produced has no coagulative property and viscosity peculiar to gum and serves well as toilet material. Then, suitable substances which have sterilizing, healing or cleaning action such as boric acid, benzoic acid, glycerol, alcohol or caustic potash and perfume are added to the solution.

For cleaning, the toilet material thus obtained may be coated on the skin, it being wiped away after several minutes. Even a small quantity of it, if rubbed well into the skin, will serve as powder base.

Having now particularly described and ascertained the nature of my said invention, and in what manner the same is to be performed, I declare that what I claim is:

1. A process for manufacturing a cosmetic for the skin consisting in dissolving india rubber in a volatile solvent with the aid of heat, adding water to said solution until the india rubber is present in the concentration of from 2 to 5% and boil said mixture under atmosphere pressure until the coagulative property of the india rubber is lost, then distil the emulsion of india rubber under reduced pressure so as to drive away the volatile solvent.

2. A process of producing a cosmetic for the skin by dissolving india rubber in a volatile solvent adding water thereto, boiling said mixture until the coagulative property of the india rubber is lost under increased pressure and distilling said mixture under reduced pressure until the volatile solvent has disappeared.

3. A process of preparing a cosmetic for the skin by dissolving india rubber in benzol adding water to said solution to obtain an emulsion of said india rubber, boiling said emulsion under the pressure of 10 atmospheres, and distilling said emulsion under reduced pressure until the volatile solvent has evaporated.

4. A process for preparing a cosmetic for the skin by dissolving india rubber in benzol adding water thereto, boiling under increased pressure until a permanent emulsion of india rubber has been produced, and then boiling under reduced pressure until the volatile solvent has evaporated.

5. A process for preparing a cosmetic for the skin by dissolving india rubber in benzol adding water thereto, boiling under increased pressure until a permanent emulsion of india rubber has been produced, and then boiling under reduced pressure until the volatile solvent has evaporated, and adding sterilizing material to the emulsion.

In testimony whereof I hereunto affix my signature.

TOKUJIRO HASHIMOTO.